(12) United States Patent
Shim et al.

(10) Patent No.: US 10,728,972 B2
(45) Date of Patent: *Jul. 28, 2020

(54) LIGHT CONTROL CIRCUIT AND OPTICAL ENCODER SYSTEM

(71) Applicant: PixArt Imaging Inc., Hsin-Chu County (TW)

(72) Inventors: Kuan-Choong Shim, Penang (MY); Gim-Eng Chew, Penang (MY)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/579,121

(22) Filed: Sep. 23, 2019

(65) Prior Publication Data

US 2020/0022235 A1 Jan. 16, 2020

Related U.S. Application Data

(63) Continuation of application No. 16/209,065, filed on Dec. 4, 2018, now Pat. No. 10,462,869, which is a continuation of application No. 15/993,798, filed on May 31, 2018, now Pat. No. 10,187,948.

(51) Int. Cl.
*H05B 45/10* (2020.01)
*G01D 5/347* (2006.01)
*H05B 45/37* (2020.01)

(52) U.S. Cl.
CPC ......... *H05B 45/10* (2020.01); *G01D 5/34715* (2013.01); *H05B 45/37* (2020.01)

(58) Field of Classification Search
CPC ... H05L 345/10; H05B 45/37; G01D 5/34715

USPC ......................................................... 315/150
See application file for complete search history.

(56) References Cited

U.S. PATENT DOCUMENTS

| | | | | |
|---|---|---|---|---|
| 4,074,939 A * | 2/1978 | Rabl | .................. | G01N 21/0303 250/574 |
| 5,805,558 A * | 9/1998 | Kimura | ................ | G11B 7/0943 369/116 |
| 5,915,279 A * | 6/1999 | Cantrall | ............... | G01B 11/105 73/800 |
| 10,187,948 B1 * | 1/2019 | Shim | ....................... | H05B 45/10 |
| 2002/0008193 A1 * | 1/2002 | Bois | ........................ | B82Y 20/00 250/214 R |
| 2007/0131847 A1 * | 6/2007 | Yao | ......................... | H04B 10/07 250/214 R |
| 2008/0238411 A1 * | 10/2008 | Kahlman | .................. | G01V 3/08 324/204 |
| 2016/0238442 A1 * | 8/2016 | Griffith | ................. | G01J 1/4228 |

* cited by examiner

*Primary Examiner* — Don P Le
(74) *Attorney, Agent, or Firm* — WPAT, PC

(57) ABSTRACT

There is provided a light control circuit including a detected voltage generating circuit, a reference voltage generating circuit, an error amplifier, an NMOS driver and a light source. The detected voltage generating circuit outputs a detected voltage to a first input terminal of the error amplifier. The reference voltage generating circuit outputs a reference voltage to a second input terminal of the error amplifier. The NMOS driver changes a drive current of the light source according to an output of the error amplifier.

20 Claims, 8 Drawing Sheets

LIGHT CONTROL CIRCUIT AND OPTICAL ENCODER SYSTEM

RELATED APPLICATIONS

The present application is a continuation application of U.S. application Ser. No. 16/209,065, filed on Dec. 4, 2018, which is a continuation application of U.S. application Ser. No. 15/993,798, filed on May 31, 2018, the disclosures of which are hereby incorporated by reference herein in their entirety.

BACKGROUND

1. Field of the Disclosure

This disclosure generally relates to a light control circuit and, more particularly, to a control circuit of a light source in an optical encoder system and an optical encoder system using the same.

2. Description of the Related Art

In an optical detection system, it is generally required to detect a stable light intensity. One method to achieve this requirement is to control a system light source to maintain stable emission intensity.

For example, FIG. 1 shows a conventional optical detection system which includes a light detector 91, a reference voltage generator 93, an error amplifier 95, an NMOS driver 97 and a light emitting diode (LED). The light detector 91 is used to detect modulated light to generate a detected signal, e.g., as shown in FIG. 2A. The light detector 91 also retrieves a common mode voltage $V_{CM}$ of the detected signal as an output signal Vdet. The reference voltage generator 93 outputs a reference voltage Vref based on a desired common mode voltage. The error amplifier 95 compares the output signal Vdet and the reference voltage Vref to cancel common mode noise. The NMOS driver 97 regulates a drive current of the LED according to an output of the error amplifier 95 to control emission intensity thereof.

However, as the system is not perfect and can have a dark current leakage and a reflected light leakage, the common mode voltage $V_{CM}$ of the output signal Vdet can have a dc shift, e.g., FIG. 2B showing that the common mode voltage $V_{CM}$ shifts from 1.15 volt. to 1.17 volt. However, the reference voltage Vref outputted by the reference voltage generator 93 does not change at the same time such that the LED is not controlled to emit light at desired intensity.

Accordingly, it is necessary to provide a light control circuit that can eliminate the dc offset of photodiode current.

SUMMARY

The present disclosure provides a light control circuit having a low circuit area, adaptable to environmental change and easily implementable, and an optical encoder system using the same.

The present disclosure further provides an optical encoder system adopting a quadrature detection technique. The optical encoder system regulates the emission intensity of a light source by adopting a light control circuit which has squaring circuits.

The present disclosure provides a light control circuit including a first circuit, a second circuit, a sum circuit, a converting circuit and a constant voltage source. The first circuit is configured to receive a first detected signal, a second detected signal and a common mode voltage signal, and output a first current signal, wherein the second detected signal is out of phase from the first detected signal. The second circuit is configured to receive a third detected signal, a fourth detected signal and the common mode voltage signal, and output a second current signal, wherein the third detected signal is perpendicular to the first detected signal, the fourth detected signal is perpendicular to the second detected signal, and the common mode voltage signal is obtained according to the first, second, third and fourth detected signals. The sum circuit is configured to calculate a sum of the first current signal and the second current signal. The converting circuit is configured to convert the sum of the first current signal and the second current signal to a detected voltage signal. The constant voltage source is configured to output a reference voltage signal output a reference voltage signal to be compared with the detected voltage signal.

The present disclosure further provides an optical encoder system including a code disk and an encapsulated package. The code disk is formed with codes thereon to modulate incident light. The encapsulated package is arranged corresponding to the code disk and including a light source, a light detector, a trans-impedance amplifier, a reference voltage generating circuit and a controller. The light source is configured to generate the incident light to illuminate the code disk to generate modulated reflection light by the code disk. The light detector is configured to receive the modulated reflection light and generate a first current signal, a second current signal, a third current signal and a fourth current signal, wherein the first current signal and the second current signal are out of phase, and the third current signal and the fourth current signal are out of phase. The trans-impedance amplifier is configured to amplify and convert the first current signal, the second current signal, the third current signal and the fourth current to respectively generate a first detected signal, a second detected signal, a third detected signal and a fourth detected signal. The reference voltage generating circuit is configured to generate a reference voltage signal. The controller includes a common mode voltage circuit, a first circuit, a second circuit, a sum circuit, a first converting circuit, an error amplifier and an NMOS driver. The common mode voltage circuit is configured to generate a common mode voltage signal according to the first detected signal, the second detected signal, the third detected signal and the fourth detected signal. The first circuit is configured to receive the first detected signal, the second detected signal and the common mode voltage signal, and output a first current signal. The second circuit is configured to receive the third detected signal, the fourth detected signal and the common mode voltage signal, and output a second current signal. The sum circuit is configured to calculate a sum of the first current signal and the second current signal. The first converting circuit is configured to convert the sum of the first current signal and the second current signal to a detected voltage signal. The error amplifier is configured to receive the detected voltage signal and the reference voltage signal via two input terminals thereof. The NMOS driver is connected to an output terminal of the error amplifier and configured to control a drive current of the light source.

In the light control circuit of the present disclosure, a reference voltage generating circuit is formed by a constant voltage source, by a circuit having a reference squaring circuit and a converting circuit or by other voltage generators.

In the optical encoder system of the present disclosure, an encoding medium is formed with different codes to modulate incident light. The modulated reflection light impinges on different photodiodes of a light detector to generate current signals, e.g., sine signals and cos signals, having 90-degree phase shift from one another. A trans-impedance amplifier (TIA) is used to amplify and convert the current signals to voltage signals.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 3:
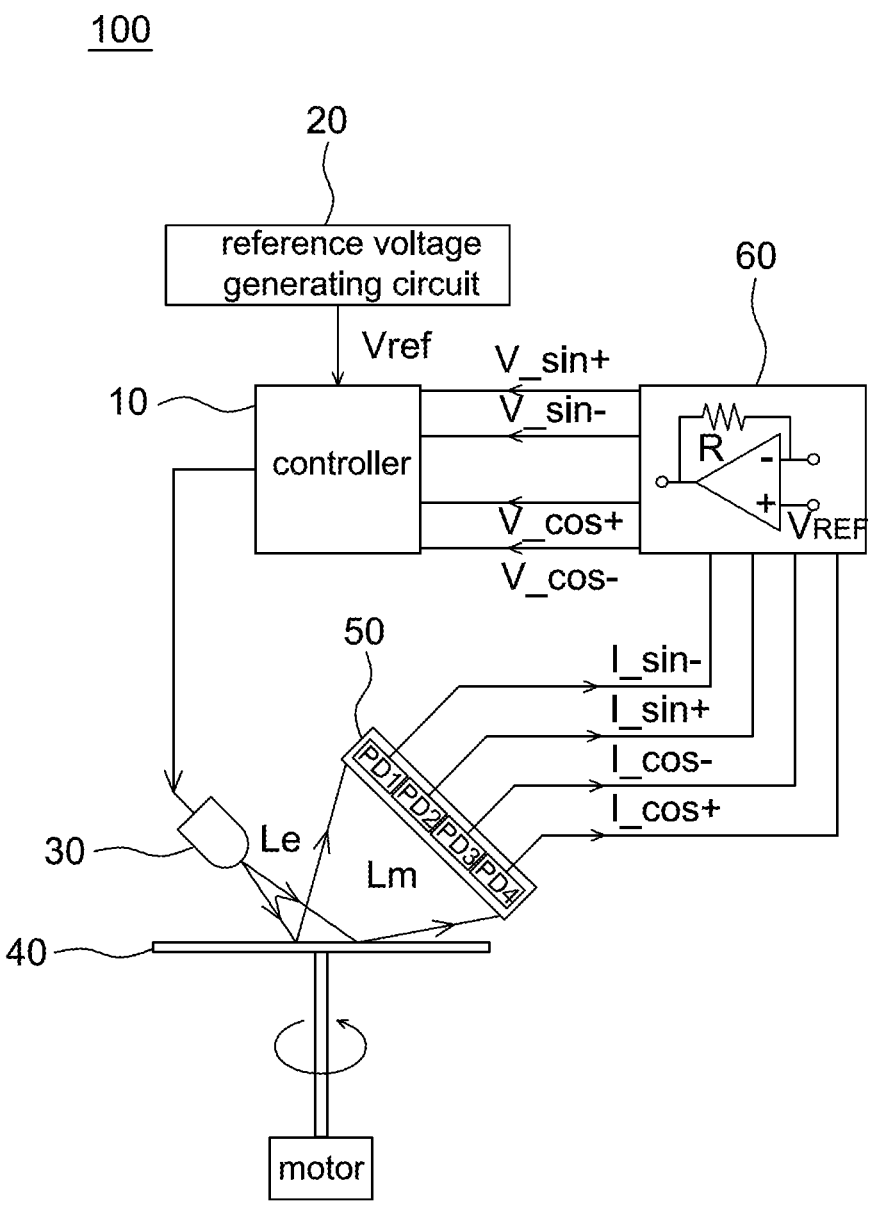
FIG. 3 is a schematic diagram of an optical encoder system according to one embodiment of the present disclosure.

Referring to FIG. 3, it is a schematic diagram of an optical encoder system 100 according to one embodiment of the present disclosure. The optical encoder system 100 includes a controller 10, a reference voltage generating circuit 20, a light source 30, an encoding medium 40, a light detector 50 and a trans-impedance amplifier (TIA) 60. In a non-limiting embodiment, the controller 10, the reference voltage generating circuit 20, the light source 30, the light detector 50 and the TIA 60 of the optical encoder system 100 are encapsulated, for example, in a same package to form a control module. The control module is arranged corresponding to the encoding medium 40 to perform a decoding operation.

In a non-limiting embodiment, the controller 10, the reference voltage generating circuit 20 and the TIA 60 form a light control circuit of the present disclosure. The light control circuit controls the light source 30 to emit stable light intensity according to the detection result of the light detector 50.

The encoding medium 40 is, for example, a code disk on which different codes are formed to modulate incident light from the light source 30. The light source 30 is, for example, a light emitting diode or a laser diode, to generate emission light Le of a predetermined wavelength (e.g., red light or infrared light) to illuminate the encoding medium 40. The incident light is modulated by codes on the encoding medium 40 to generate modulated reflection light Lm. FIG. 3 shows that the code disk is controlled by a motor to rotate in a counterclockwise direction, and thus different codes thereon are illuminated by the emission light Le of the light source 30 to generate the modulated reflection light Lm. As the encoding method of the encoding medium 40 is not an object of the present disclosure, any conventional encoding method can be used as long as the light detector 50 generates predetermined current signals (described below with an example) by sensing the modulated reflection light Lm.

The light detector 50 is arranged at a proper location to receive the modulated reflection light Lm. The light detector 50 is, for example, a CCD image sensor, a CMOS image sensor or other sensors for detecting light energy to generate electrical signals. For example, the light detector 50 includes a first photodiode PD1, a second photodiode PD2, a third photodiode PD3 and a fourth photodiode PD4 configured to receive the modulated reflection light Lm and respectively generate a first current signal I_sin−, a second current signal I_sin+, a third current signal I_cos− and a fourth current signal I_cos+, wherein the first current signal I_sin− and the second current signal I_sin+ (e.g., sign signals) are out of phase, the third current signal I_cos− and the fourth current signal I_cos+ (e.g., cos signals) are out of phase, the first current signal I_sin− has a 90-degree phase shift (i.e. perpendicular) from the third current signal I_cos−, and the second current signal I_sin+ has a 90-degree phase shift (i.e. perpendicular) from the fourth current signal I_cos+.

It should be mentioned that although FIG. 3 shows only four photodiodes PD1 to PD4, the present disclosure is not limited thereto. In a non-limiting embodiment, each of the photodiodes PD1 to PD4 in FIG. 3 includes multiple photodiodes, and each of the current signals is an average current or a current summation of the multiple photodiodes of each photodiode group. For example, the first current signal I_sin− is an average current or a current summation of multiple first photodiodes PD1, the second current signal I_sin+ is an average current or a current summation of multiple second photodiodes PD2 and so on.

The TIA 60 is a conventional single-stage or multi-stage trans-impedance amplifier without particular limitations as long as an input signal is amplified with a predetermined gain to a predetermined peak-to-peak value (e.g., 1 volt. peak-to-peak voltage, but not limited to). The TIA 60 is used to amplify and convert the first current signal I_sin−, the second current signal I_sin+, the third current signal I_cos− and the fourth current signal I_cos+ to respectively generate and output a first detected signal V_sin−, a second detected signal V_sin+, a third detected signal V_cos− and a fourth detected signal V_cos+, wherein the first detected signal V_sin− and the third detected signal V_cos− have a 90-degree phase shift, the third detected signal V_cos− and the second detected signal V_sin+ have a 90-degree phase shift, and the second detected signal V_sin+ and the fourth detected signal V_cos+ have a 90-degree phase shift.

In one embodiment, the TIA 60 does not change phases of the first current signal I_sin−, the second current signal I_sin+, the third current signal I_cos− and the fourth current signal I_cos+ during current-voltage conversion such that the first detected signal V_sin−, the second detected signal V_sin+, the third detected signal V_cos− and the fourth detected signal V_cos+ respectively have an identical phase with the first current signal I_sin−, the second current signal I_sin+, the third current signal I_cos− and the fourth current signal I_cos+.

In another embodiment, the TIA 60 changes a same phase of the first current signal I_sin−, the second current signal I_sin+, the third current signal I_cos− and the fourth current signal I_cos+ during current-voltage conversion such that the first detected signal V_sin−, the second detected signal V_sin+, the third detected signal V_cos− and the fourth detected signal V_cos+ respectively have a same phase offset from the first current signal I_sin−, the second current signal I_sin+, the third current signal I_cos− and the fourth current signal I_cos+. That is, the phase relationship between the first detected signal V_sin−, the second detected signal V_sin+, the third detected signal V_cos− and the fourth detected signal V_cos+ is substantially identical to that between the first current signal I_sin−, the second current signal I_sin+, the third current signal I_cos− and the fourth current signal I_cos+.

Figure 4:
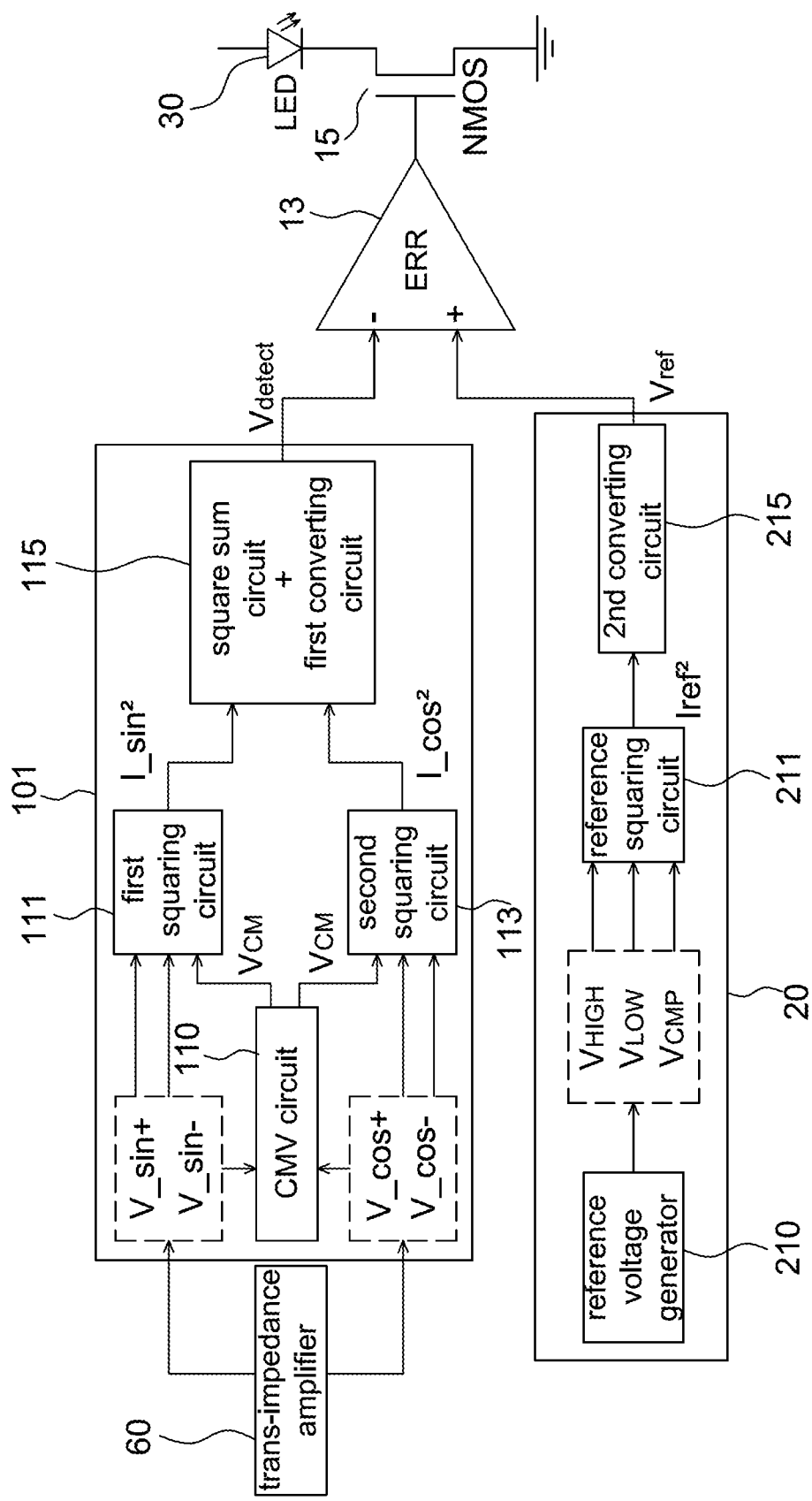
FIG. 4 is a block diagram of a light control circuit according to one embodiment of the present disclosure.

Referring to FIG. 4, it is a block diagram of a light control circuit according to one embodiment of the present disclosure. It should be mentioned that although FIG. 3 shows that the reference voltage generating circuit 20 and the TIA 60 is arranged outside of the controller 10, the present disclosure is not limited thereto. In a non-limiting embodiment, the reference voltage generating circuit 20 and the TIA 60 are included in the controller 10.

The detected voltage generating circuit 101 of the controller 10 includes a common mode voltage circuit 110, a first squaring circuit 111, a second squaring circuit 113, and a square sum circuit and first converting circuit 115. The controller 10 further includes an error amplifier 13 and an NMOS driver 15.

The common mode voltage circuit 110 includes an averaging resistor circuit for averaging the first detected signal V_sin−, the second detected signal V_sin+, the third detected signal V_cos− and the fourth detected signal V_cos+. For example referring to FIG. 5, the averaging resistor circuit of the common mode voltage circuit 110 includes an averaging resistor R1 for receiving the first detected signal V_sin−, an averaging resistor R2 for receiving the second detected signal V_sin+, an averaging resistor R3 for receiving the third detected signal V_cos− and an averaging resistor R4 for receiving the fourth detected signal V_cos+. The averaging resistor circuit of the common mode voltage circuit 110 further includes an averaging resistor R5 connecting the averaging resistors R1 and R2 and an averaging resistor R6 connecting the averaging resistors R3 and R4. The common mode voltage circuit 110 generates a common mode voltage signal $V_{CM}$ according to the first detected signal V_sin−, the second detected signal V_sin+, the third detected signal V_cos− and the fourth detected signal V_cos+.

Figure 6:
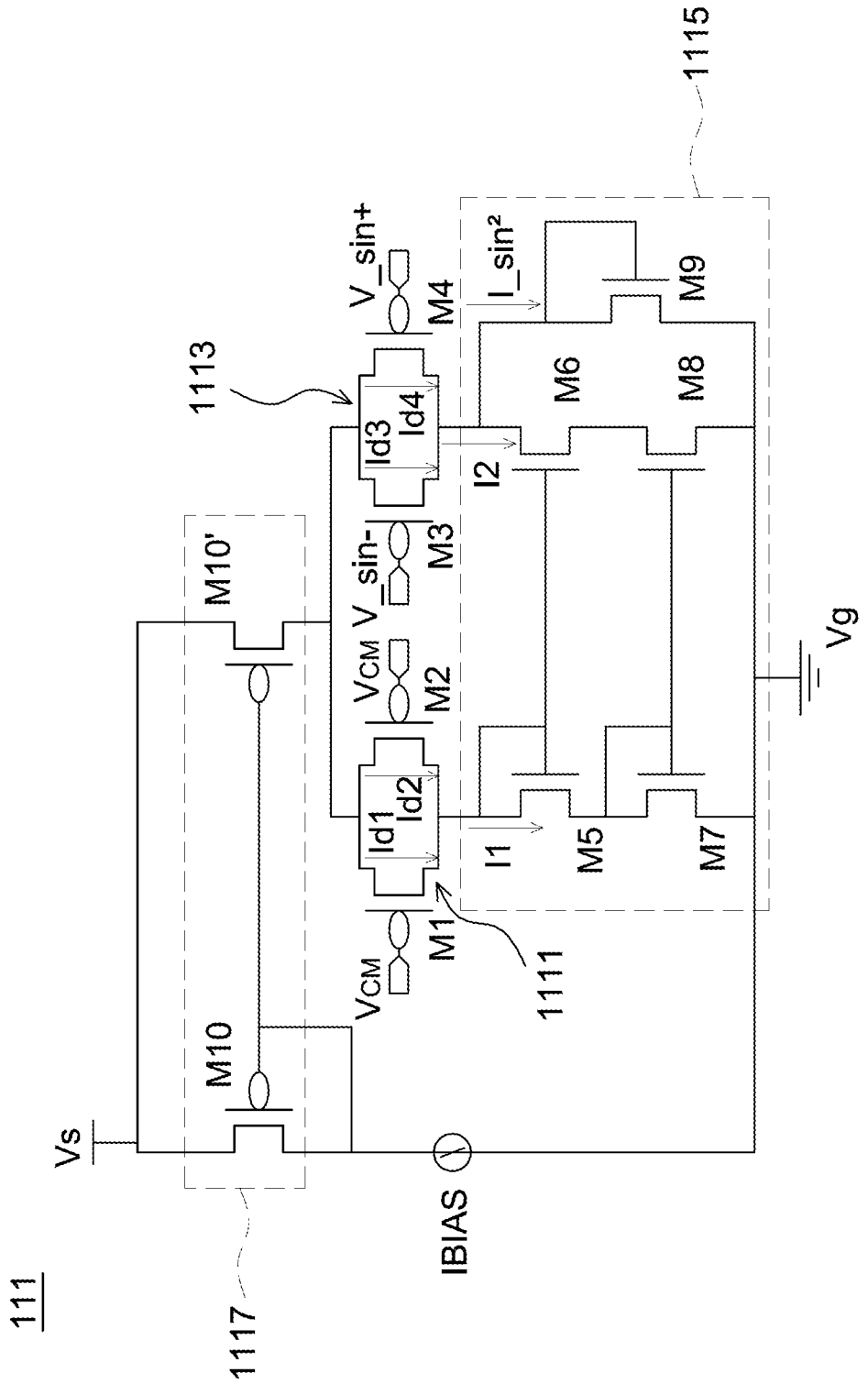
FIG. 6 is a circuit diagram of a squaring circuit of a light control circuit according to one embodiment of the present disclosure.

The first squaring circuit 111 is used to receive the first detected signal V_sin−, the second detected signal V_sin+ and the common mode voltage signal $V_{CM}$, and output a first current squaring signal $I\_sin^2$. Referring to FIG. 6, it is a circuit diagram of a first squaring circuit 111 according to one embodiment of the present disclosure. The first squaring circuit 111 includes a first transistor group 1111, a second transistor group 1113, a first subtraction circuit 1115 and a first biasing circuit 1117. FIG. 6 shows that transistors in the first transistor group 1111, the second transistor group 1113 and the first biasing circuit 1117 are PMOS transistors, and transistors in the first subtraction circuit 1115 are NMOS transistors, but the present disclosure is not limited thereto.

The first transistor group 1111 includes two transistors M1 and M2 having drains and sources coupled to each other as shown in FIG. 6. Gates of the two transistors M1 and M2 of the first transistor group 1111 are respectively configured to receive the common mode voltage signal $V_{CM}$. The first transistor group 1111 is configured to output a first current I1.

The second transistor group 1113 includes two transistors M3 and M4 having drains and sources coupled to each other as shown in FIG. 6. Gates of the two transistors M3 and M4 of the second transistor group 1113 are respectively configured to receive the first detected signal V_sin− and the second detected signal V_sin+. The second transistor group 1113 is configured to output a second current I2.

The first biasing circuit 1117 is connected between a voltage source Vs and the first transistor group 1111 as well as the second transistor group 1113 as shown in FIG. 6. The first biasing circuit 1117 includes two transistors M10 and M10' having gates thereof coupled to each other. Sources of the two transistors M10 and M10' of the first biasing circuit 1117 are coupled to the voltage source Vs. The gate of one of the two transistors (shown as M10 herein) of the first biasing circuit 1117 is coupled to a drain thereof. A drain of the other one of the two transistors (shown as M10' herein) of the first biasing circuit 1117 is coupled to sources of the two transistors M1 and M2 of the first transistor group 1111 and sources of the two transistors M3 and M4 of the second transistor group 1113.

The first subtraction circuit 1115 is connected between ground voltage Vg and the first transistor group 1111 as well as the second transistor group 1113 as shown in FIG. 6. The first subtraction circuit 1115 is configured to perform a differential operation on the first current I1 and the second current I2 to generate a first current squaring signal $I\_sin^2$.

According to the principle of transistors, a drain current Id3 of the transistor M3 is indicated by equation (1):

$$Id3=[Vs-(V_G+Vamp1)-Vtp]^2\times K/2=(Vr-Vamp1)^2\times K/2 \qquad (1)$$

wherein, $Vr=Vs-V_G-Vtp$, $V_G$ is a gate voltage of the transistor M3, Vamp1 is an amplitude of V_sin−, K is a conductive parameter, and Vtp is a threshold voltage.

Similarly, a drain current Id4 of the transistor M4 is indicated by equation (2):

$$Id4=(Vr-Vamp2)^2\times K/2 \qquad (2)$$

wherein Vamp2 is an amplitude of V_sin+.

Similarly, a drain current Id1 of the transistor M1 and a drain current Id2 of the transistor M2 are indicated by equation (3):

$$Id1=Id2=K\times Vr^2 \qquad (3)$$

Assuming Vamp1=Vamp2=Vamp, it is obtained that $(Id3+Id4)-(Id1+Id2)=K\times Vamp^2=I\_sin^2$, which is referred to a first current squaring signal herein.

The first subtraction circuit 1115 includes a fifth transistor M5, a sixth transistor M6, a seventh transistor M7, an eighth transistor M8 and a ninth transistor M9.

A gate of the fifth transistor M5 is coupled to a drain thereof, and the drain of the fifth transistor M5 is coupled to drains of the two transistors M1 and M2 of the first transistor group 1111 to receive the first current I1.

A gate of the sixth transistor M6 is coupled to the gate of the fifth transistor M5, and a drain of the sixth transistor M6 is coupled to drains of the two transistors M3 and M4 of the second transistor group 1113 to receive the second current I2.

A gate of the seventh transistor M7 is coupled to a drain thereof, the drain of the seventh transistor M7 is coupled to a source of the fifth transistor M5, and a source of the seventh transistor M7 is coupled to the ground voltage Vg.

A gate of the eighth transistor M8 is coupled to the gate of the seventh transistor M7, a drain of the eighth transistor M8 is coupled to a source of the sixth transistor M6, and a source of the eighth transistor M8 is coupled to the ground voltage Vg.

A gate of the ninth transistor M9 is coupled to a drain thereof, the drain of the ninth transistor M9 is coupled between the drain of the sixth transistor M6 and the second transistor group 1113, and a source of the ninth transistor M9 is coupled to the ground voltage Vg. The first current squaring signal $I\_sin^2$ flows through the ninth transistor M9.

It should be mentioned that although FIG. 6 shows that the first current I1 flows through two cascaded transistors M5 and M7, and the second current I2 flows through two cascaded transistors M6 and M8, but the present disclosure is not limited thereto. A number of transistors that the first current I1 and the second current I2 go through is not limited to 2 and is determined according to the circuit parameter.

The second squaring circuit 113 is used to receive the third detected signal V_cos−, the fourth detected signal V_cos+ and the common mode voltage signal $V_{CM}$, and output a second current squaring signal $I\_cos^2$.

Figure 7:
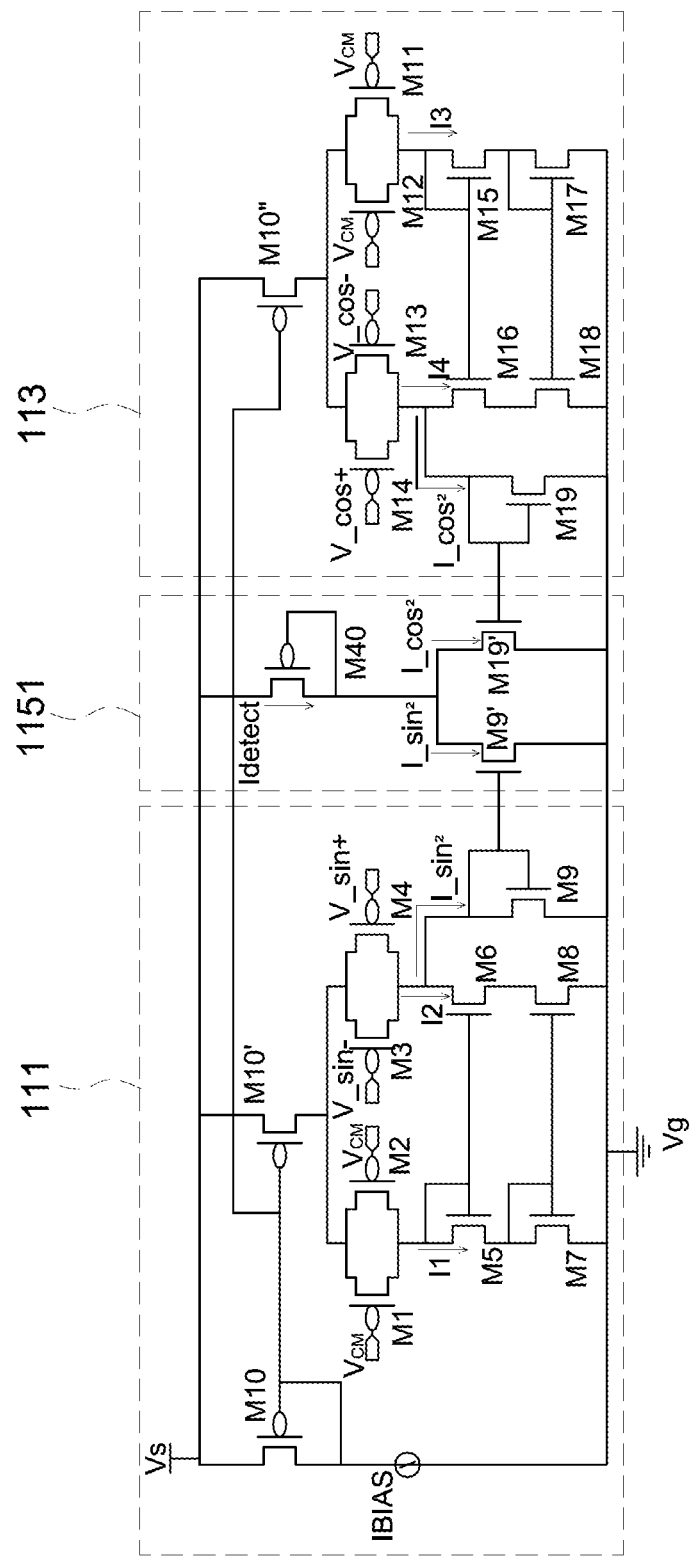
FIG. 7 is a partial circuit diagram of a controller of a light control circuit according to one embodiment of the present disclosure.

Referring to FIG. 7, it is a partial circuit diagram of a controller 10 according to one embodiment of the present disclosure. The second squaring circuit 113 is similar to the first squaring circuit 111, and the main difference therebetween is that detected signals to be received are different. The second squaring circuit 113 includes a third transistor group including M11 and M12, a fourth transistor group including M13 and M14, a second biasing circuit and a second subtraction circuit. For simplifying the diagram, FIG. 7 does not show reference numerals to indicate the third transistor group, the fourth transistor, the second biasing circuit and the second subtraction circuit.

FIG. 7 shows that transistors in the third transistor group, the fourth transistor group and the second biasing circuit are PMOS transistors, and transistors in the second subtraction circuit are NMOS transistors, but not limited thereto.

The third transistor group includes two transistors M11 and M12 having drains and sources coupled to each other as shown in FIG. 7. Gates of the two transistors M11 and M12 of the third transistor group are respectively configured to receive the common mode voltage signal $V_{CM}$. The third transistor group is configured to output a third current I3.

The fourth transistor group includes two transistors M13 and M14 having drains and sources coupled to each other as shown in FIG. 7. Gates of the two transistors M13 and M14 of the fourth transistor group are respectively configured to receive the third detected signal V_cos− and the fourth detected signal V_cos+. The fourth transistor group is configured to output a fourth current I4.

The second biasing circuit is connected between a voltage source Vs and the third transistor group as well as the fourth transistor group as shown in FIG. 7. The second biasing circuit includes two transistors M10 and M10″ having gates thereof coupled to each other. Sources of the two transistors M10 and M10″ of the second biasing circuit are coupled to the voltage source Vs. The gate of one of the two transistors (shown as M10 herein) of the second biasing circuit is coupled to a drain thereof. A drain of the other one of the two transistors (shown as M10″ herein) of the second biasing circuit is coupled to sources of the two transistors M11 and M12 of the third transistor group and sources of the two transistors M13 and M14 of the fourth transistor group.

The second subtraction circuit is connected between ground voltage Vg and the third transistor group as well as the fourth transistor group as shown in FIG. 7. The second subtraction circuit is configured to perform a differential operation on the third current I3 and the fourth current I4 to generate the second current squaring signal $I\_cos^2$, wherein the method of the second squaring circuit 113 generating the second current squaring signal $I\_cos^2$ is similar to the first squaring circuit 111 generating the first current squaring signal $I\_sin^2$, e.g., referring to equations (1)-(3), and thus details thereof are not repeated herein. The second subtraction circuit includes a transistor M15, a transistor M16, a transistor M17, a transistor M18 and a transistor M19, and the connection between the transistors M15 to M19 in the second subtraction circuit is similar to that in the first subtraction circuit 1115 and shown in FIG. 7, and thus details thereof are not repeated herein.

Figure 8:
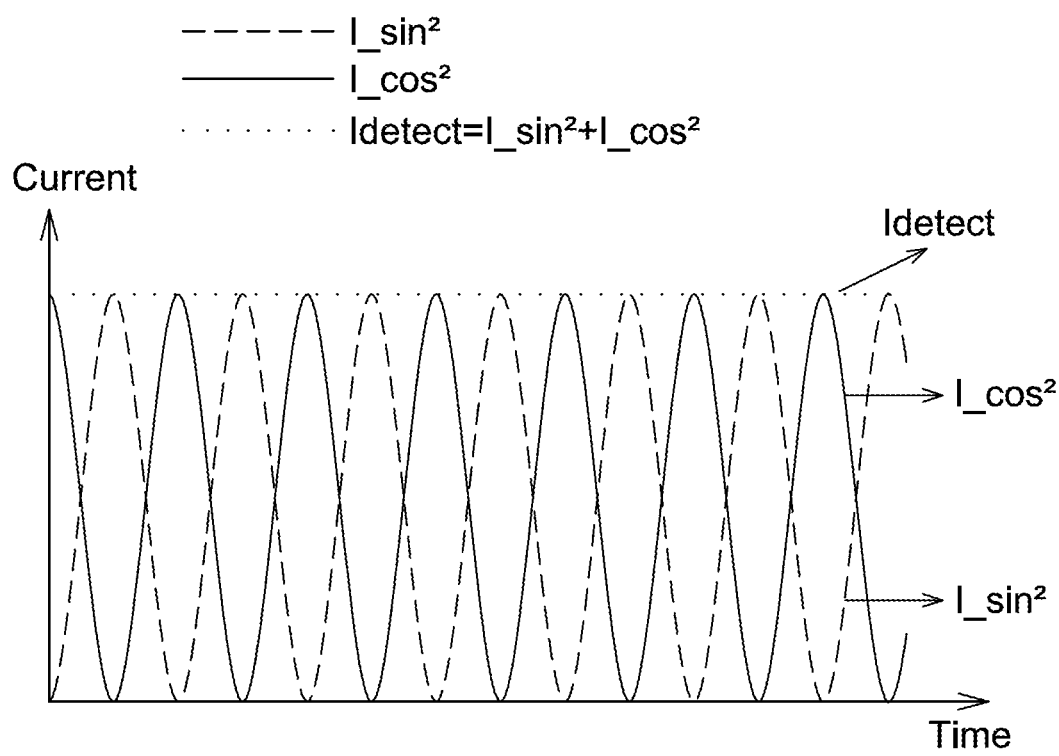
FIG. 8 is a schematic diagram showing a sum of current squaring of a light control circuit according to one embodiment of the present disclosure.

Referring to FIG. 7 again, the square sum circuit 1151 is used to calculate a sum of current squaring $(I\_sin^2+I\_cos^2)$ of the first current squatting signal $I\_sin^2$ and the second current squatting signal $I\_cos^2$ to generate a dc electrical signal Idetect as shown in FIG. 8.

The square sum circuit 1151 includes a fifth transistor group including M9′ and M19′ and a square sum transistor M40, wherein FIG. 7 shows that transistors in the fifth transistor group are NMOS transistors, and the square sum transistor M40 is a PMOS transistor, but not limited thereto. The fifth transistor group includes two transistors M9′ and M19′ having drains and sources coupled to each other. Gates of the two transistors M9′ and M19′ of the fifth transistor group are respectively coupled to the transistor M9 of the first subtraction circuit 1115 and the transistor M19 of the second subtraction circuit to reflect the first current squaring signal $I\_sin^2$ and the second current squaring signal $I\_cos^2$. That is, the transistor M9′ and the transistor M9 form a current mirror, and the transistor M19′ and the transistor M19 form another current mirror. It is assumed that the mirror ratio herein is 1.

A source of the square sum transistor M40 is coupled to the voltage source Vs. A gate of the square sum transistor M40 is coupled to a drain thereof. The drain of the square sum transistor M40 is coupled to the drains of the two transistors M9′ and M19′ of the fifth transistor group to generate the sum of current squaring Idetect=$(I\_sin^2+I\_cos^2)$.

Figure 9:
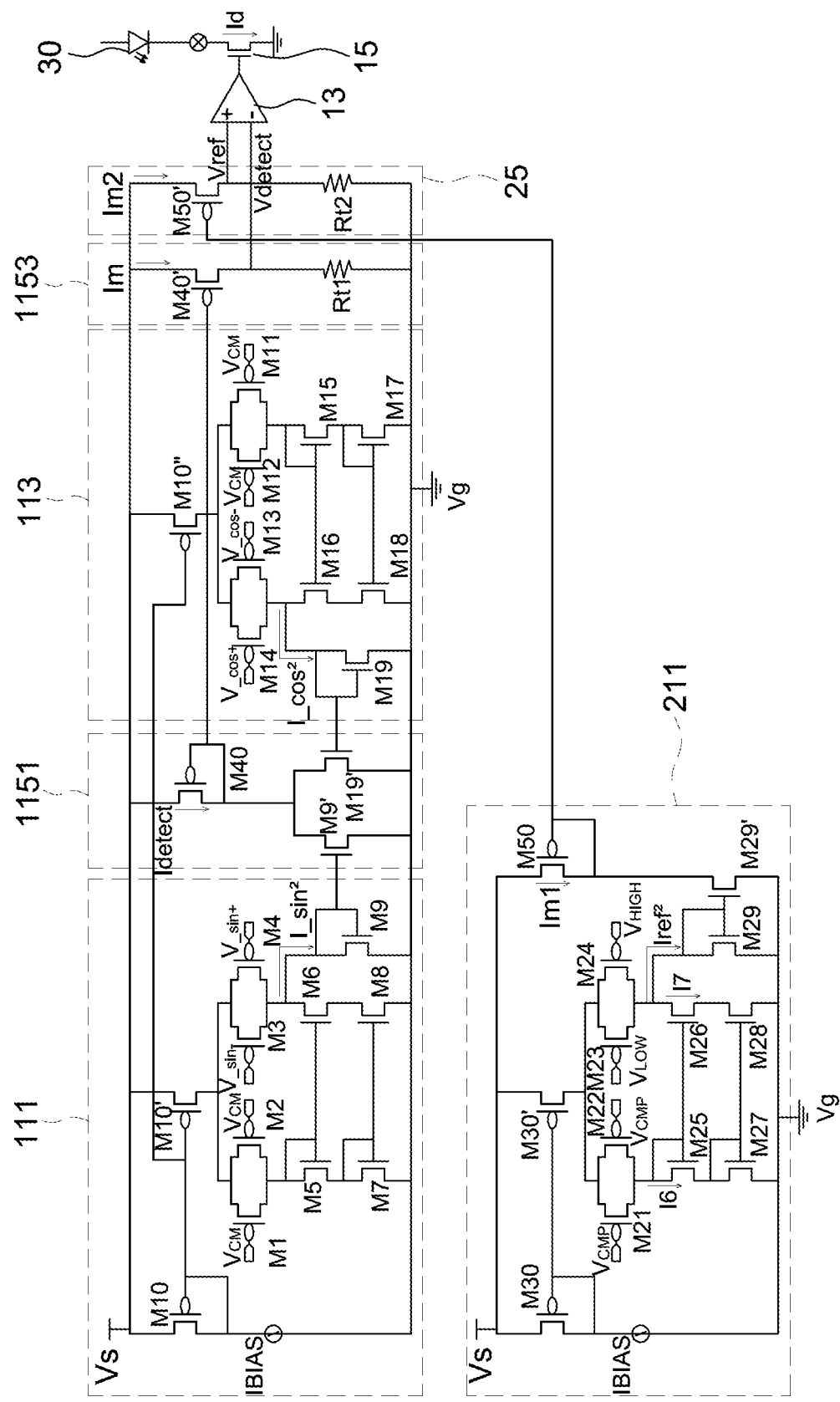
FIG. 9 is a circuit diagram of a light control circuit according to one embodiment of the present disclosure.

Referring to FIG. 9, it is a circuit diagram of a light control circuit according to one embodiment of the present disclosure. The first converting circuit 1153 is used to convert the sum of current squaring Idetect to a detected voltage signal Vdetect. The first converting circuit 1153 includes a first converting transistor M40′ and a first converting resistor Rt1 coupled together.

A gate of the first converting transistor M40′ is coupled to a gate of the square sum transistor M40 to generate a mirror current Im of the sum of current squaring $(I\_sin^2+I\_cos^2)$. When the mirror ratio is 1, the mirror current Im is substantially equal to the sum of current squaring Idetect=$(I\_sin^2+I\_cos^2)$.

Figure 5:
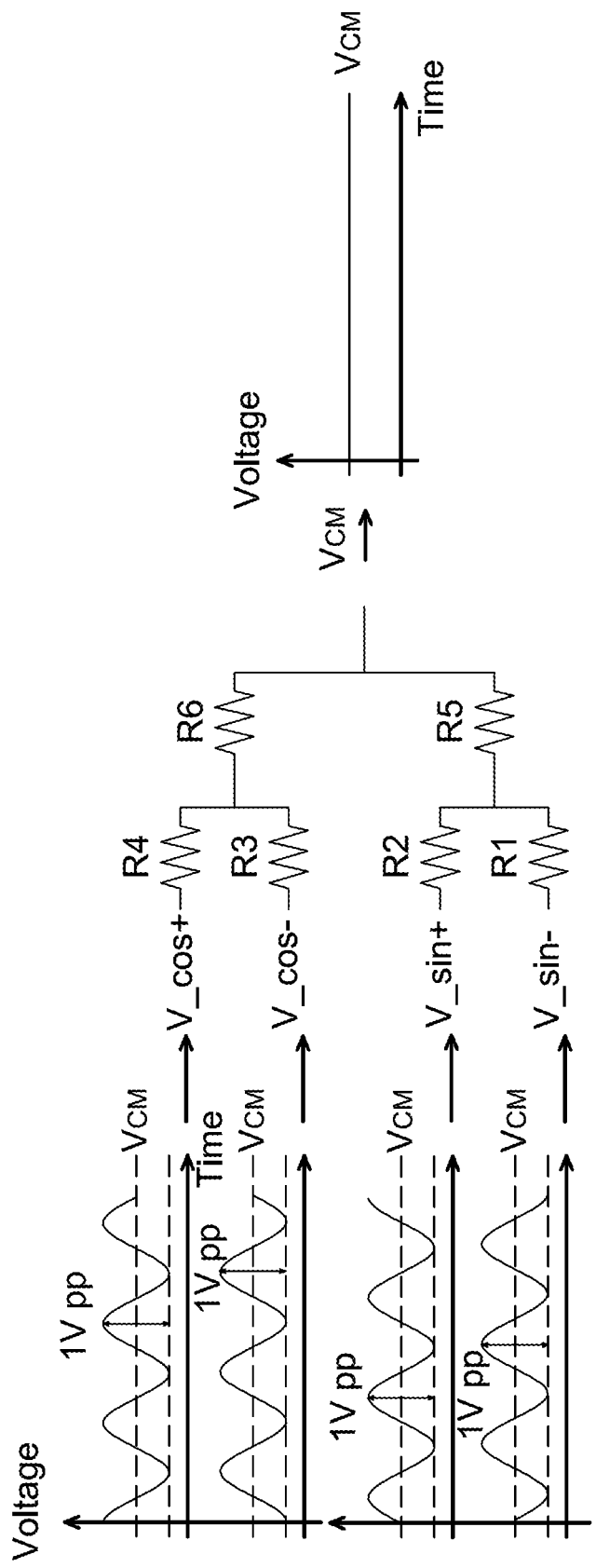
FIG. 5 is a schematic diagram of a common mode voltage circuit of a light control circuit according to one embodiment of the present disclosure.

When the mirror current Im of the sum of current squaring flows through the first converting resistor Rt1, a detected voltage signal Vdetect is generated. In this way, the detected voltage generating circuit 101 converts the voltage signals having different phases (e.g., as shown in FIG. 5) to a dc signal which is used a negative feedback for controlling a drive current of the light source 30.

The reference voltage generating circuit 20 is used to generate a reference voltage signal Vref to one input terminal of the error amplifier 13, e.g., a positive input as shown in FIG. 4. The reference voltage signal Vref is a predetermined voltage used to control the NMOS driver 15 to drive the light source 30 with a desired drive current.

In a non-limiting embodiment, the reference voltage generating circuit 20 includes a constant voltage source to output the reference voltage signal Vref.

In a non-limiting embodiment, the reference voltage generating circuit 20 includes a reference voltage generator 210, a reference squaring circuit 211 and a second converting circuit 215 as shown in FIG. 4, wherein the reference squaring circuit 211 has the same circuit structure as the first squaring circuit 111 to overcome the environmental (e.g., voltage and temperature) variation, and the difference is in their input voltage signals.

The reference voltage generator 210 is used to generate a desired first amplitude voltage $V_{HIGH}$, a desired second amplitude voltage $V_{LOW}$ and a desired common mode voltage $V_{CMP}$ (all previously determined), wherein the desired common mode voltage $V_{CMP}$ is an average value of the desired first amplitude voltage $V_{HIGH}$ and the desired second amplitude voltage $V_{LOW}$; the first amplitude voltage $V_{HIGH}$ is higher than the second amplitude voltage $V_{LOW}$. In one non-limiting embodiment, the first amplitude voltage $V_{HIGH}$ and the second amplitude voltage $V_{LOW}$ are selected according to the product specification. The desired common mode voltage $V_{CMP}$ is a predetermined voltage for defining a value of the drive current of the light source 30. That is, when the detected voltage signal Vdetect is larger than the desired common mode voltage $V_{CMP}$, the drive current of the light source 30 is reduced by the NMOS driver 15 to lower the emission intensity. On the contrary, when the detected voltage signal Vdetect is smaller than the desired common mode voltage $V_{CMP}$, the drive current of the light source 30 is increased by the NMOS driver 15 to enhance the emission intensity to keep a substantially identical drive current.

The reference squaring circuit 211 is used to receive the desired first amplitude voltage $V_{HIGH}$, the desired second amplitude voltage $V_{LOW}$ and the desired common mode voltage $V_{CMP}$, and output a reference current squaring signal $Iref^2$. The second converting circuit 215 includes a second converting transistor M50' and a second converting resistor Rt2 coupled together for converting the reference current squaring signal $Iref^2$ to the reference voltage signal Vref. Functions of the second converting transistor M50' and second converting resistor Rt2 are similar to those of the first converting transistor M40' and first converting resistor Rt1.

For example referring to FIG. 9, the reference squaring circuit 211 includes a sixth transistor group including M21 and M22, a seventh transistor group including M23 and M24, a third biasing circuit including M30 and M30', a third subtraction circuit including M25 to M29 and a current mirror circuit including M50 and M29'.

The sixth transistor group includes two transistors M21 and M22 (shown as PMOS transistors herein) having drains and sources coupled to each other as shown in FIG. 9. Gates of the two transistors M21 and M22 of the sixth transistor group are respectively configured to receive the desired common mode voltage $V_{CMP}$. The sixth transistor group is configured to output a sixth current I6.

The seventh transistor group includes two transistors M23 and M24 (shown as PMOS transistors herein) having drains and sources coupled to each other as shown in FIG. 9. Gates of the two transistors M23 and M24 of the seventh transistor group are respectively configured to receive the second voltage $V_{LOW}$ and the desired first amplitude voltage $V_{HIGH}$. The seventh transistor group is configured to output a seventh current I7.

The third biasing circuit is connected between a voltage source Vs and the sixth transistor group as well as the seventh transistor group. For example, the third biasing circuit includes two transistors M30 and M30' (shown as PMOS transistors herein) having gates thereof coupled to each other. Sources of the two transistors M30 and M30' of the third biasing circuit are coupled to the voltage source Vs. The gate of one of the two transistors (shown as M30 herein) of the third biasing circuit is coupled to a drain thereof. A drain of the other one of the two transistors (shown as M30' herein) of the third biasing circuit is coupled to sources of the two transistors M21 and M22 of the sixth transistor group and sources of the two transistors M23 and M24 of the seventh transistor group.

The third subtraction circuit is connected between ground voltage Vg and the sixth transistor group as well as the seventh transistor group. The third subtraction circuit is configured to perform a differential operation on the sixth current I6 and the seventh current I7 to generate the reference current squaring signal $Iref^2$. For example, the third subtraction circuit includes a transistor M25, a transistor M26, a transistor M27, a transistor M28 and a transistor M29, wherein FIG. 9 shows that transistors included in the third subtraction circuit are NMOS transistors, but not limited thereto.

A gate of the transistor M25 is coupled to a drain thereof. The drain of the transistor M25 is coupled to drains of the two transistors M21 and M22 of the sixth transistor group to receive the sixth current I6.

A gate of the transistor M26 is coupled to the gate of the transistor 25. A drain of the transistor M26 is coupled to drains of the two transistors M23 and M24 of the seventh transistor group to receive the seventh current I7.

A gate of the transistor M27 is coupled to a drain thereof. The drain of the transistor M27 is coupled to a source of the transistor M25. A source of the transistor M27 is coupled to the ground voltage Vg.

A gate of the transistor M28 is coupled to the gate of the transistor M27. A drain of the transistor M28 is coupled to a source of the transistor M26. A source of the transistor M28 is coupled to the ground voltage Vg.

A gate of the transistor M29 is coupled to a drain thereof. The drain of the transistor M29 is coupled between the drain of the transistor M26 and the seventh transistor group. A source of the transistor M29 is coupled to the ground voltage Vg. The drain current of the transistor M29 is obtained by subtraction between the sixth current I6 and the seventh current I7 as the reference current squaring signal $Iref^2$. The generating of $Iref^2$ is similar to $I\_sin^2$ and can be referred to equations (1)-(3).

The current mirror circuit is used to generate a first mirror current Im1 of the reference current squaring signal $Iref^2$. When a mirror ratio is 1, the first mirror current Im1 is substantially identical to the reference current squaring signal $Iref^2$. The current mirror circuit includes a transistor M29' which is used to form a current mirror with the transistor M29, and further includes a transistor 50 for forming a current mirror with the second converting transistor M50' in a second converting circuit 25.

The second converting circuit 25 includes a second converting transistor M50' and a second converting resistor Rt2 coupled to each other. A gate of the second converting transistor M50' is coupled to a gate of the transistor M50 of the current mirror circuit to reflect the first mirror current Im1 to generate a second mirror current Im2 of the reference current squaring signal Iref$^2$. Similarly, when a mirror ratio of the second current mirror M50 and M50' is 1, the second mirror current Im2 is substantially identical to the reference current squaring signal Iref$^2$. When the second mirror current Im2 of the reference current squaring signal Iref$^2$ flows through the second converting resistor Rt2, a reference voltage signal Vref is generated.

Other non-described component connections are shown in FIG. 9.

A first input terminal (shown as negative input herein) of the error amplifier 13 receives the detected voltage signal Vdetect, and a second input terminal (shown as positive input herein) of the error amplifier 13 receives the reference voltage signal Vref to perform the comparison therebetween. It should be mentioned that voltage signals received from the first input terminal and the second input terminal of the error amplifier 13 are exchangeable.

The NMOS driver 15 is coupled to an output terminal of the error amplifier 13. The NMOS driver 15 is used to regulate a drain current Id thereof according to a comparison result of the error amplifier 13, wherein the drain current Id is used as a drive current of the light source 30.

It should be mentioned that although in the above embodiment the mirror ratio of every current mirror is assumed to be 1, the present disclosure is not limited thereto. The mirror ratio of every current mirror may not be selected as 1 as long as the reference voltage signal Vref inputted into the error amplifier 13 is controlled at a desired value.

It should be mentioned that although in the above embodiment the encoding medium 40 is described as a reflection type and performing a rotating operation, the present disclosure is not limited thereto. In other embodiments, the encoding medium 40 is a transmissive type (i.e., the light source and the light detector are arranged at different sides) and is transparent or semi-transparent to light from the light source 300. In other embodiments, the encoding medium 40 40 performs one-dimension, two-dimension or three-dimension linear movement.

It should be mentioned that although in the above embodiment the light control circuit is described by applying to an optical encoder system 100, the present disclosure is not limited thereto. The light control circuit is adaptable to any application that requires controlling the emission intensity of a light source stably. In addition, the emission intensity of a light source is not limited to be controlled by controlling the drive current thereof, and it is also possible to control a drive voltage thereof depending on the light source being used. For example, a drive voltage is generated by directing the drain current of the NMOS driver to pass through a resistor.

Figure 1:
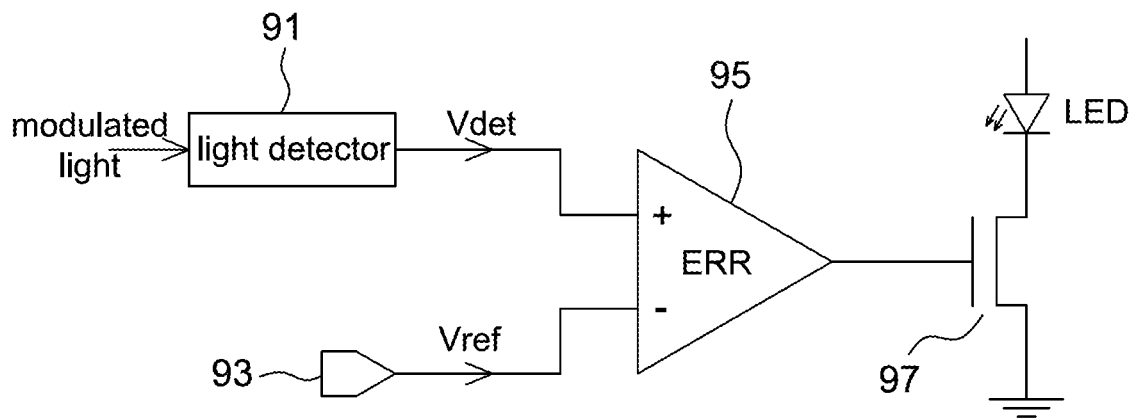
FIG. 1 is a schematic diagram of a conventional light control circuit.
Figure 2A:
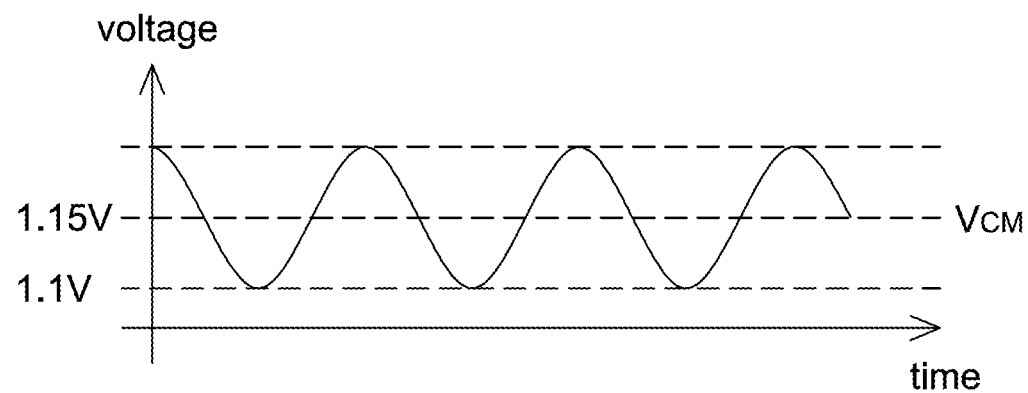
FIG. 2A is a voltage signal without a dc offset outputted by the light control circuit in FIG. 1.
Figure 2B:
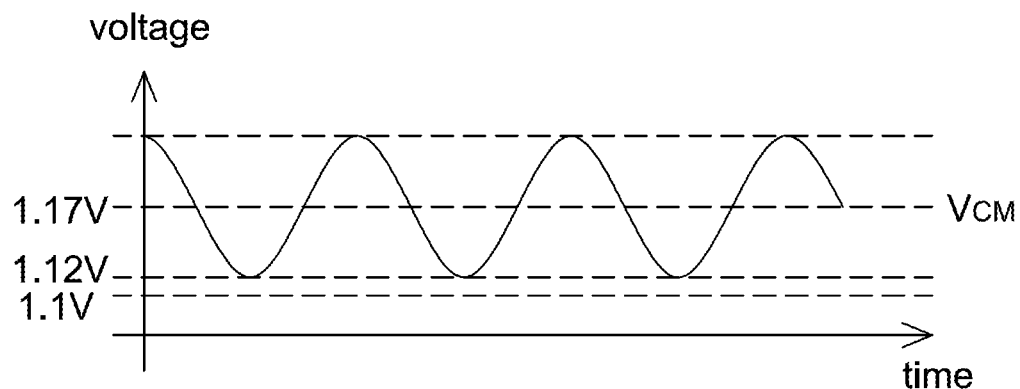
FIG. 2B is a voltage signal with a dc offset outputted by the light control circuit in FIG. 1.

As mentioned above, the conventional light control circuit can be affected by dark current leakage and reflected light leakage to be unable to correctly control brightness of a light source. Accordingly, the present disclosure further provides a light control circuit (e.g., FIG. 9) and an optical encoder system (e.g. FIG. 1) that eliminate the common mode voltage in the detected signal using a squaring circuit at first and then compare a detected voltage signal with a desired control voltage. As the dc offset is eliminated in the differential operation and the desired control voltage is also changed with the environmental change, a drive current of the light source is effectively stabilized.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A light control circuit, comprising:
   a first circuit configured to receive a first detected signal, a second detected signal and a common mode voltage signal, and output a first current signal, wherein the second detected signal is out of phase from the first detected signal;
   a second circuit configured to receive a third detected signal, a fourth detected signal and the common mode voltage signal, and output a second current signal, wherein the third detected signal is perpendicular to the first detected signal, the fourth detected signal is perpendicular to the second detected signal, and the common mode voltage signal is obtained according to the first, second, third and fourth detected signals;
   a sum circuit configured to calculate a sum of the first current signal and the second current signal;
   a converting circuit configured to convert the sum of the first current signal and the second current signal to a detected voltage signal; and
   a constant voltage source configured to output a reference voltage signal to be compared with the detected voltage signal.

2. The light control circuit as claimed in claim 1, further comprising a trans-impedance amplifier configured to output the first, second, third and fourth detected signals.

3. The light control circuit as claimed in claim 1, further comprising a common mode voltage circuit, wherein the common mode voltage circuit comprises an averaging resistor circuit configured to average the first, second, third and fourth detected signals to generate the common mode voltage signal.

4. The light control circuit as claimed in claim 1, wherein the first circuit comprises:
   a first transistor group comprising two transistors having drains and sources coupled to each other, wherein gates of the two transistors of the first transistor group are respectively configured to receive the common mode voltage signal, and the first transistor group is configured to output a first current;
   a second transistor group comprising two transistors having drains and sources coupled to each other, wherein gates of the two transistors of the second transistor group are respectively configured to receive the first detected signal and the second detected signal, and the second transistor group is configured to output a second current;
   a first biasing circuit connected between a voltage source and the first transistor group as well as the second transistor group; and
   a first subtraction circuit connected between ground voltage and the first transistor group as well as the second transistor group, wherein the first subtraction circuit is configured to perform a differential operation on the first current and the second current to generate the first current signal.

5. The light control circuit as claimed in claim 4, wherein first subtraction circuit comprises:
   a fifth transistor, a gate of the fifth transistor being coupled to a drain thereof, and the drain of the fifth transistor being coupled to the first transistor group to receive the first current;
   a sixth transistor, a gate of the sixth transistor being coupled to the gate of the fifth transistor, and a drain of the sixth transistor being coupled to the second transistor group to receive the second current;
a seventh transistor, a gate of the seventh transistor being coupled to a drain thereof, the drain of the seventh transistor being coupled to a source of the fifth transistor, and a source of the seventh transistor being coupled to the ground voltage;
an eighth transistor, a gate of the eighth transistor being coupled to the gate of the seventh transistor, a drain of the eighth transistor being coupled to a source of the sixth transistor, and a source of the eighth transistor being coupled to the ground voltage; and
a ninth transistor, a gate of the ninth transistor being coupled to a drain thereof, the drain of the ninth transistor being coupled to the drain of the sixth transistor, and a source of the ninth transistor being coupled to the ground voltage.

6. The light control circuit as claimed in claim 4, wherein the first biasing circuit comprises two transistors having gates coupled to each other,
sources of the two transistors of the first biasing circuit are coupled to the voltage source,
the gate of one of the two transistors of the first biasing circuit is coupled to a drain thereof, and
a drain of the other one of the two transistors of the first biasing circuit is coupled to the first transistor group as well as the second transistor group.

7. The light control circuit as claimed in claim 4, wherein the second circuit comprises:
a third transistor group comprising two transistors having drains and sources coupled to each other, wherein gates of the two transistors of the third transistor group are respectively configured to receive the common mode voltage signal, and the third transistor group is configured to output a third current;
a fourth transistor group comprising two transistors having drains and sources coupled to each other, wherein gates of the two transistors of the fourth transistor group are respectively configured to receive the third detected signal and the fourth detected signal, and the fourth transistor group is configured to output a fourth current;
a second biasing circuit connected between the voltage source and the third transistor group as well as the fourth transistor group; and
a second subtraction circuit connected between the ground voltage and the third transistor group as well as the fourth transistor group, wherein the second subtraction circuit is configured to perform a differential operation on the third current and the fourth current to generate the second current signal.

8. The light control circuit as claimed in claim 7, wherein second subtraction circuit comprises:
a fifteenth transistor, a gate of the fifteenth transistor being coupled to a drain thereof, and the drain of the fifteenth transistor being coupled to the third transistor group to receive the third current;
a sixteenth transistor, a gate of the sixteenth transistor being coupled to the gate of the fifteenth transistor, and a drain of the sixteenth transistor being coupled to the fourth transistor group to receive the fourth current;
a seventeenth transistor, a gate of the seventeenth transistor being coupled to a drain thereof, the drain of the seventeenth transistor being coupled to a source of the fifteenth transistor, and a source of the seventeenth transistor being coupled to the ground voltage;
an eighteenth transistor, a gate of the eighteenth transistor being coupled to the gate of the seventeenth transistor, a drain of the eighteenth transistor being coupled to a source of the sixteenth transistor, and a source of the eighteenth transistor being coupled to the ground voltage; and
a nineteenth transistor, a gate of the nineteenth transistor being coupled to a drain thereof, the drain of the nineteenth transistor being coupled to the drain of the sixteenth transistor, and a source of the nineteenth transistor being coupled to the ground voltage.

9. The light control circuit as claimed in claim 8, wherein the second biasing circuit comprises two transistors having gates coupled to each other,
sources of the two transistors of the second biasing circuit are coupled to the voltage source,
one of the two transistors of the second biasing circuit is the transistor of the first biasing circuit having the gate coupled to the drain, and
a drain of the other one of the two transistors of the second biasing circuit is coupled to the third transistor group as well as the fourth transistor group.

10. The light control circuit as claimed in claim 7, wherein the sum circuit comprises:
a fifth transistor group comprising two transistors having drains and sources coupled to each other, wherein gates of the two transistors of the fifth transistor group are respectively coupled to the first subtraction circuit and the second subtraction circuit to reflect the first current signal and the second current signal; and
a sum transistor, a source of the sum transistor being coupled to the voltage source, a gate of the sum transistor being coupled to a drain thereof, and the drain of the sum transistor being coupled to the drains of the two transistors of the fifth transistor group to generate the sum of the first current signal and the second current signal.

11. The light control circuit as claimed in claim 8, wherein the converting circuit comprises:
a first converting transistor, a gate of the first converting transistor being coupled to the gate of the sum transistor to reflect a mirror current of the sum of the first current signal and the second current signal; and
a first converting resistor, wherein the mirror current of the sum of the first current signal and the second current signal passes through the first converting resistor to generate the detected voltage signal.

12. The light control circuit as claimed in claim 1, further comprising an error amplifier configured to compare the reference voltage signal and the detected voltage signal.

13. The light control circuit as claimed in claim 12, further comprising an NMOS driver coupled to an output terminal of the error amplifier and configured to adjust a drain current thereof according to an output of the error amplifier, wherein the drain current is a light source drive current.

14. An optical encoder system, comprising:
a code disk formed with codes thereon to modulate incident light;
an encapsulated package arranged corresponding to the code disk, and comprising:
a light source configured to generate the incident light to illuminate the code disk to generate modulated reflection light by the code disk;
a light detector configured to receive the modulated reflection light and generate a first current signal, a second current signal, a third current signal and a fourth current signal, wherein the first current signal and the second current signal are out of phase, and the third current signal and the fourth current signal are out of phase;
a trans-impedance amplifier configured to amplify and convert the first current signal, the second current signal, the third current signal and the fourth current to respectively generate a first detected signal, a second detected signal, a third detected signal and a fourth detected signal;
a reference voltage generating circuit configured to generate a reference voltage signal; and
a controller, comprising:
a common mode voltage circuit configured to generate a common mode voltage signal according to the first detected signal, the second detected signal, the third detected signal and the fourth detected signal;
a first circuit configured to receive the first detected signal, the second detected signal and the common mode voltage signal, and output a first current signal;
a second circuit configured to receive the third detected signal, the fourth detected signal and the common mode voltage signal, and output a second current signal;
a sum circuit configured to calculate a sum of the first current signal and the second current signal;
a first converting circuit configured to convert the sum of the first current signal and the second current signal to a detected voltage signal;
an error amplifier configured to receive the detected voltage signal and the reference voltage signal via two input terminals thereof; and
an NMOS driver connected to an output terminal of the error amplifier and configured to control a drive current of the light source.

15. The optical encoder system as claimed in claim 14, wherein the reference voltage generating circuit comprising:
a reference circuit configured to generate a reference current signal; and
a second converting circuit configured to convert the reference current signal to the reference voltage signal.

16. The optical encoder system as claimed in claim 15, wherein the reference circuit has a same circuit as the first circuit.

17. The optical encoder system as claimed in claim 14, wherein the common mode voltage circuit comprises an averaging resistor circuit configured to average the first, second, third and fourth detected signals to generate the common mode voltage signal.

18. The optical encoder system as claimed in claim 14, wherein the first circuit comprises:
a first transistor group comprising two transistors having drains and sources coupled to each other, wherein gates of the two transistors of the first transistor group are respectively configured to receive the common mode voltage signal, and the first transistor group is configured to output a first current;
a second transistor group comprising two transistors having drains and sources coupled to each other, wherein gates of the two transistors of the second transistor group are respectively configured to receive the first detected signal and the second detected signal, and the second transistor group is configured to output a second current;
a first biasing circuit connected between a voltage source and the first and the second transistor groups; and
a first subtraction circuit connected between ground voltage and the first and second transistor groups, wherein the first subtraction circuit is configured to perform a differential operation on the first current and the second current to generate the first current signal.

19. The optical encoder system as claimed in claim 18, wherein the second circuit comprises:
a third transistor group comprising two transistors having drains and sources coupled to each other, wherein gates of the two transistors of the third transistor group are respectively configured to receive the common mode voltage signal, and the third transistor group is configured to output a third current;
a fourth transistor group comprising two transistors having drains and sources coupled to each other, wherein gates of the two transistors of the fourth transistor group are respectively configured to receive the third detected signal and the fourth detected signal, and the fourth transistor group is configured to output a fourth current;
a second biasing circuit connected between the voltage source and the third and fourth transistor groups; and
a second subtraction circuit connected between the ground voltage and the third and fourth transistor groups, wherein the second subtraction circuit is configured to perform a differential operation on the third current and the fourth current to generate the second current signal.

20. The optical encoder system as claimed in claim 19, wherein the sum circuit comprises:
a fifth transistor group comprising two transistors having drains and sources coupled to each other, wherein gates of the two transistors of the fifth transistor group are respectively coupled to the first subtraction circuit and the second subtraction circuit to reflect the first current signal and the second current signal; and
a sum transistor, a source of the sum transistor being coupled to the voltage source, a gate of the sum transistor being coupled to a drain thereof, and the drain of the sum transistor being coupled to the drains of the two transistors of the fifth transistor group to generate the sum of the first current signal and the second current signal.

* * * * *